United States Patent
Tseng et al.

(10) Patent No.: US 11,668,895 B2
(45) Date of Patent: Jun. 6, 2023

(54) LENS ASSEMBLY ACTUATING MODULE AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 237 days.

(21) Appl. No.: 17/226,196

(22) Filed: Apr. 9, 2021

(65) Prior Publication Data

US 2021/0223506 A1  Jul. 22, 2021

Related U.S. Application Data

(63) Continuation of application No. 16/220,005, filed on Dec. 14, 2018, now Pat. No. 11,016,264.

(30) Foreign Application Priority Data

May 3, 2018 (TW) ................................. 107115097

(51) Int. Cl.
| G02B 7/09 | (2021.01) |
| G02B 7/02 | (2021.01) |
| G02B 27/64 | (2006.01) |

(52) U.S. Cl.
CPC .............. *G02B 7/09* (2013.01); *G02B 7/026* (2013.01); *G02B 27/646* (2013.01)

(58) Field of Classification Search
None
See application file for complete search history.

(56) References Cited

U.S. PATENT DOCUMENTS

| 8,582,222 | B2 | 11/2013 | Huang et al. |
| 9,778,437 | B2 | 10/2017 | Matsuhisa |
| 2012/0154614 | A1 | 6/2012 | Moriya et al. |
| 2013/0016428 | A1 | 1/2013 | Sugawara et al. |
| 2016/0077305 | A1 | 3/2016 | Park et al. |
| 2016/0139426 | A1 | 5/2016 | Park |
| 2016/0154204 | A1 | 6/2016 | Lim et al. |
| 2016/0178925 | A1 | 6/2016 | Park et al. |
| 2016/0209621 | A1 | 7/2016 | Park et al. |
| 2016/0216529 | A1 | 7/2016 | Park et al. |
| 2017/0235094 | A1 | 8/2017 | Osaka et al. |
| 2018/0011284 | A1 | 1/2018 | Park et al. |

(Continued)

*Primary Examiner* — Darryl J Collins
*Assistant Examiner* — Tamara Y. Washington
(74) *Attorney, Agent, or Firm* — McClure, Qualey & Rodack, LLP

(57) ABSTRACT

A lens assembly actuating module includes a holder, a metal yoke, a lens actuator and a Hall sensor. The holder includes a central opening, at least three metal connectors insert-molded with the holder, at least two metal terminals insert-molded with the holder, and a plurality of plated metal layers disposed on a surface of the holder. The metal yoke is coupled with the holder. The lens actuator is for carrying a lens unit including an optical axis. The lens actuator is movably disposed in the metal yoke. The lens actuator includes at least one elastic element and at least three metal hanging wires. The Hall sensor is disposed on one of the plated metal layers of the holder. The Hall sensor is for detecting a movement of the lens unit along a direction perpendicular to the optical axis.

12 Claims, 14 Drawing Sheets

(56) References Cited

U.S. PATENT DOCUMENTS

| | | |
|---|---|---|
| 2018/0031859 A1 | 2/2018 | Gomyo et al. |
| 2018/0252893 A1 | 9/2018 | Park et al. |
| 2018/0348469 A1 | 12/2018 | Son et al. |
| 2019/0025540 A1 | 1/2019 | Shin et al. |
| 2019/0033554 A1 | 1/2019 | Shin |
| 2019/0094565 A1 | 3/2019 | Park et al. |
| 2019/0107685 A1 | 4/2019 | Kim et al. |
| 2019/0121055 A1 | 4/2019 | Lee et al. |
| 2019/0170967 A1 | 6/2019 | Jung et al. |
| 2019/0258141 A1 | 8/2019 | Park et al. |
| 2019/0377241 A1 | 12/2019 | Lee et al. |
| 2020/0089020 A1 | 3/2020 | Lee et al. |
| 2020/0110243 A1 | 4/2020 | Lee |
| 2020/0166770 A1 | 5/2020 | Lee et al. |
| 2020/0200995 A1 | 6/2020 | Lee |
| 2020/0209710 A1 | 7/2020 | Park et al. |
| 2020/0301097 A1 | 9/2020 | Park et al. |

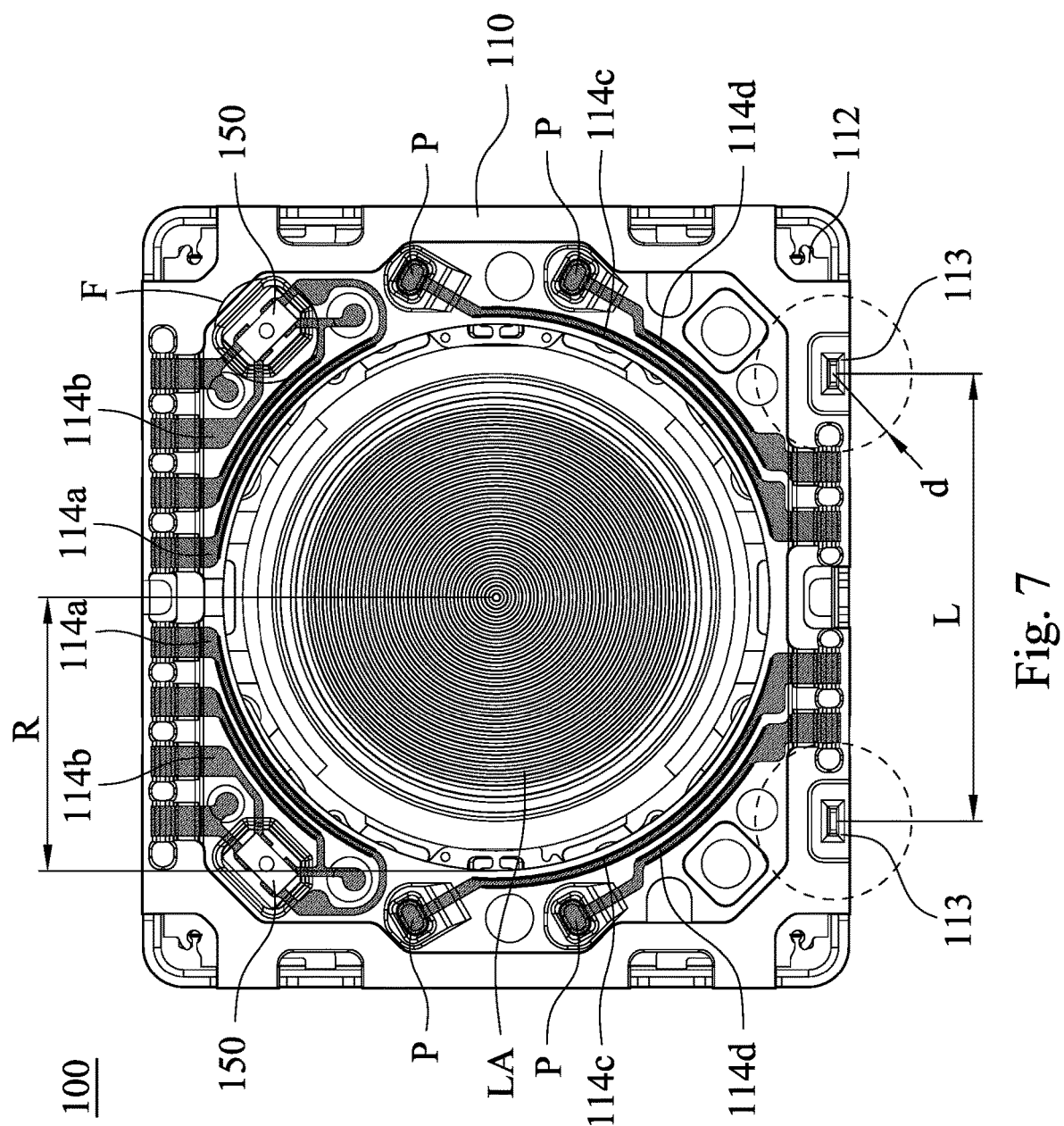

LENS ASSEMBLY ACTUATING MODULE AND ELECTRONIC DEVICE

RELATED APPLICATIONS

The present application is a continuation of the application Ser. No. 16/220,005, filed Dec. 14, 2018, which claims priority to Taiwan Application Serial Number 107115097, filed May 3, 2018, which is herein incorporated by reference.

BACKGROUND

Technical Field

The present disclosure relates to a lens assembly actuating module. More particularly, the present disclosure relates to a lens assembly actuating module applicable to an electronic device.

Description of Related Art

With the popularity of personal electronic products and mobile communication products having camera functionalities, such as smart phones and tablet personal computers, the demand for compact electronic devices with high resolution and high image quality also increases significantly.

Nowadays, a lens unit employed in an electronic device normally adopts a voice coil motor (VCM) as a driving apparatus for providing autofocus function. With an electromagnetic force generated by the interaction of magnets and a coil, and with the degree of freedom and the restoring force provided by springs which are required by the movement of the carrier carrying the lens unit, the carrier is driven by the voice coil motor to bring the lens unit to move along a direction parallel to an optical axis, so that the autofocus functionality of the lens unit can be achieved.

However, the property tests of the conventional driving apparatus, such as the focus functionality, are usually conducted on the finished product after the manufacturing process is completed. If the property tests are disqualified, the whole finished product will be scrapped, which leads to waste of material. Accordingly, it is unfavorable for reducing manufacturing cost.

SUMMARY

According to one aspect of the present disclosure, a lens assembly actuating module includes a holder, a metal yoke, a lens actuator and a Hall sensor. The holder includes a central opening, at least three metal connectors, at least two metal terminals and a plurality of plated metal layers. The metal connectors are insert-molded with the holder. The metal terminals are insert-molded with the holder. The plated metal layers are disposed on a surface of the holder. The metal yoke is coupled with the holder. The metal yoke includes a through hole, and the through hole is corresponding to the central opening of the holder. The lens actuator is for carrying a lens unit. The lens unit includes an optical axis. The lens actuator is movably disposed in the metal yoke. The lens actuator includes at least one elastic element and at least three metal hanging wires. The elastic element is disposed in the metal yoke. The elastic element includes at least three wire connecting portions. One end of each of the metal hanging wires is fixed with one of the wire connecting portions, and the other end of each of the metal hanging wires is fixed with one of the metal connectors. The Hall sensor is disposed on one of the plated metal layers of the holder. The Hall sensor is for detecting a movement of the lens unit along a direction perpendicular to the optical axis.

According to another aspect of the present disclosure, an electronic device includes the lens assembly actuating module according to the aforementioned aspect.

According to yet another aspect of the present disclosure, a lens assembly actuating module includes a holder, a metal yoke, a lens actuator and a Hall sensor. The holder includes a central opening, at least three metal connectors, at least two metal terminals and a plurality of plated metal layers. The metal connectors are insert-molded with the holder. The metal terminals are insert-molded with the holder. The plated metal layers are disposed on a surface of the holder. The metal yoke is coupled with the holder. The metal yoke includes a through hole, and the through hole is corresponding to the central opening of the holder. The lens actuator is for carrying a lens unit. The lens unit includes an optical axis. The lens actuator is movably disposed in the metal yoke. The lens actuator includes at least one elastic element and at least three metal hanging wires. The elastic element is disposed in the metal yoke. The elastic element includes at least three wire connecting portions. One end of each of the metal hanging wires is fixed with one of the wire connecting portions, and the other end of each of the metal hanging wires is fixed with one of the metal connectors. The Hall sensor is disposed on one of the plated metal layers of the holder. The Hall sensor is for detecting a movement of the lens unit along a direction perpendicular to the optical axis. The holder is made of a plastic material. The holder is a square structure. Each of the metal connectors is disposed at a corner of the square structure. Two side walls are respectively disposed between two opposite sides of the square structure and the central opening. Each of the metal terminals is disposed between one of the metal connectors and one of the side walls.

BRIEF DESCRIPTION OF THE DRAWINGS

The present disclosure can be more fully understood by reading the following detailed description of the embodiment, with reference made to the accompanying drawings as follows:

FIG. 7 is a bottom view of the lens assembly actuating module and the lens unit in the combination state of FIG. 3.

DETAILED DESCRIPTION

According to the present disclosure, "the first" and "the second" are used for nomenclature, but not for order or quality.

1st Embodiment

Figure 1:
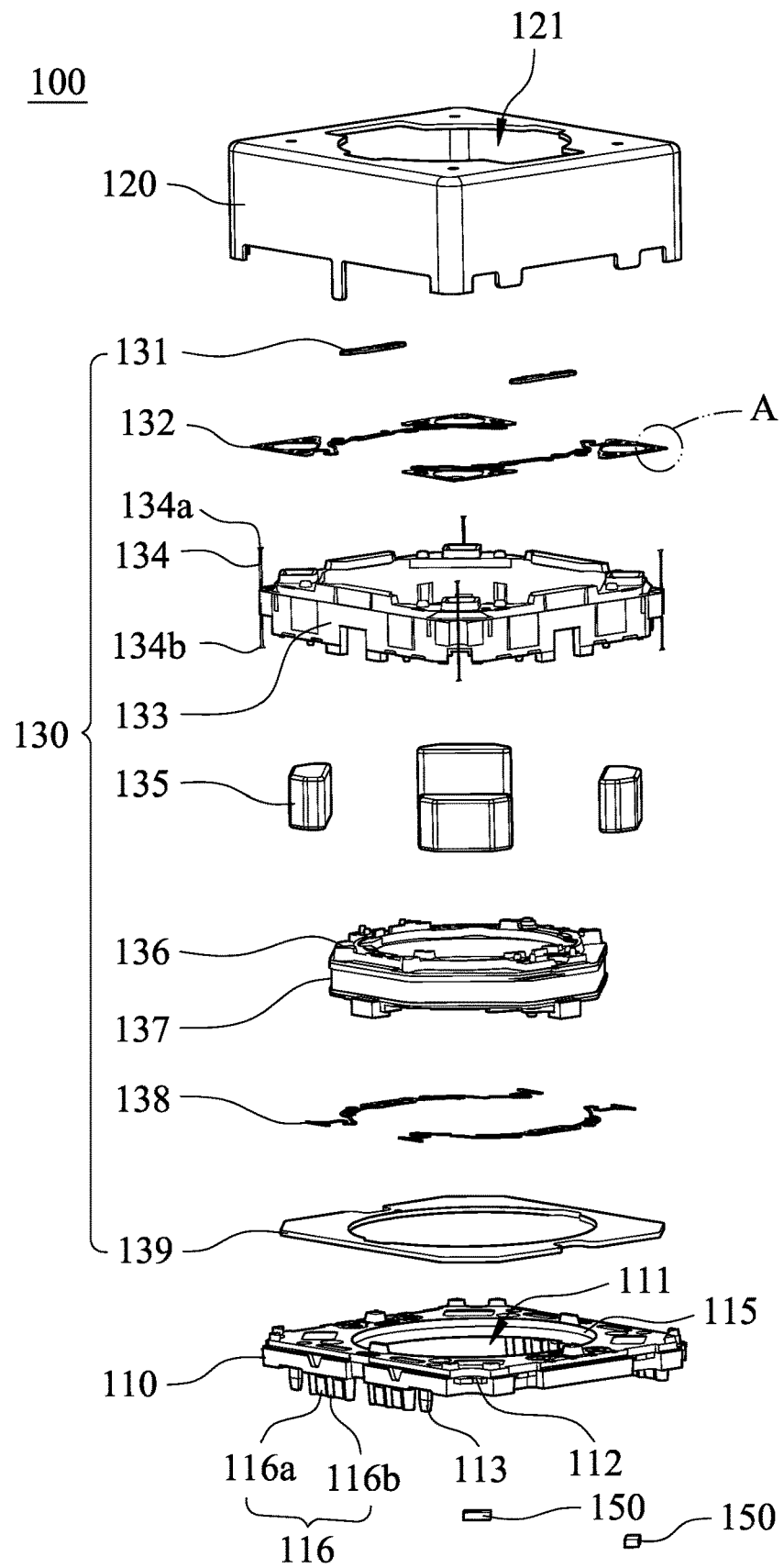
FIG. 1 is an exploded view of a lens assembly actuating module according to the 1st embodiment of the present disclosure.
Figure 2:
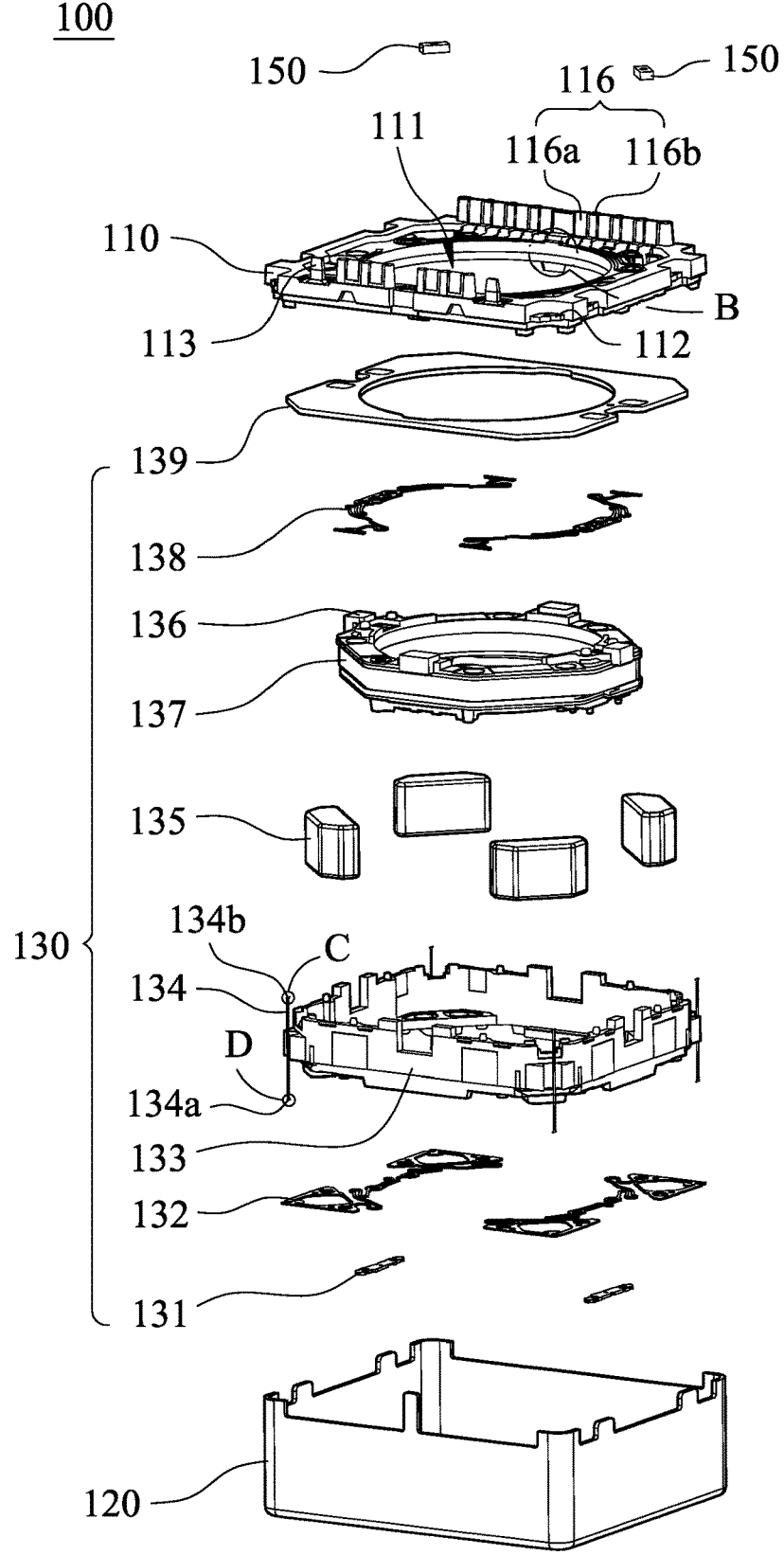
FIG. 2 is another exploded view of the lens assembly actuating module in FIG. 1.
Figure 3:
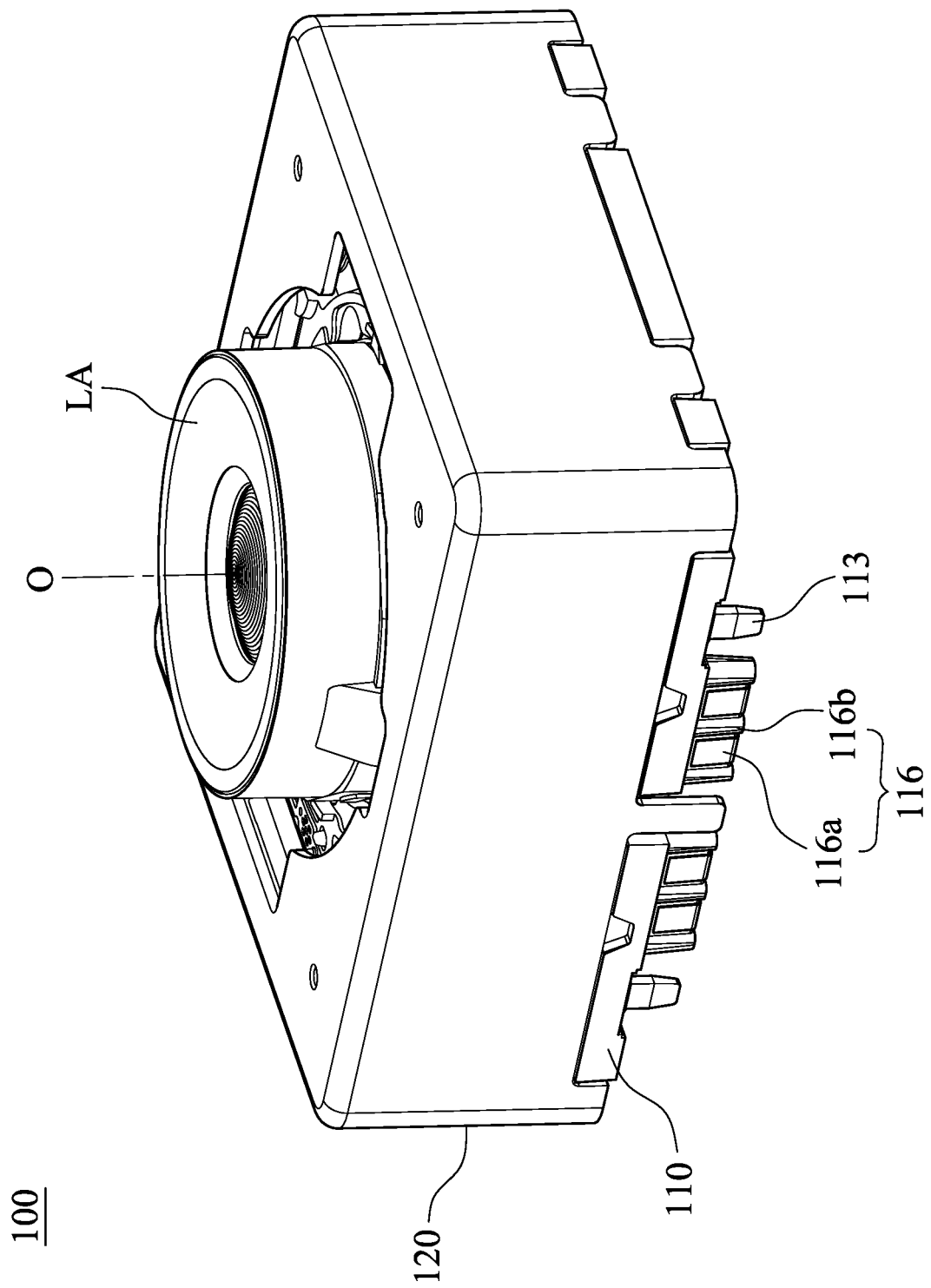
FIG. 3 is a three-dimensional view of the lens assembly actuating module in FIG. 1 and a lens unit in a combination state.
Figure 4:
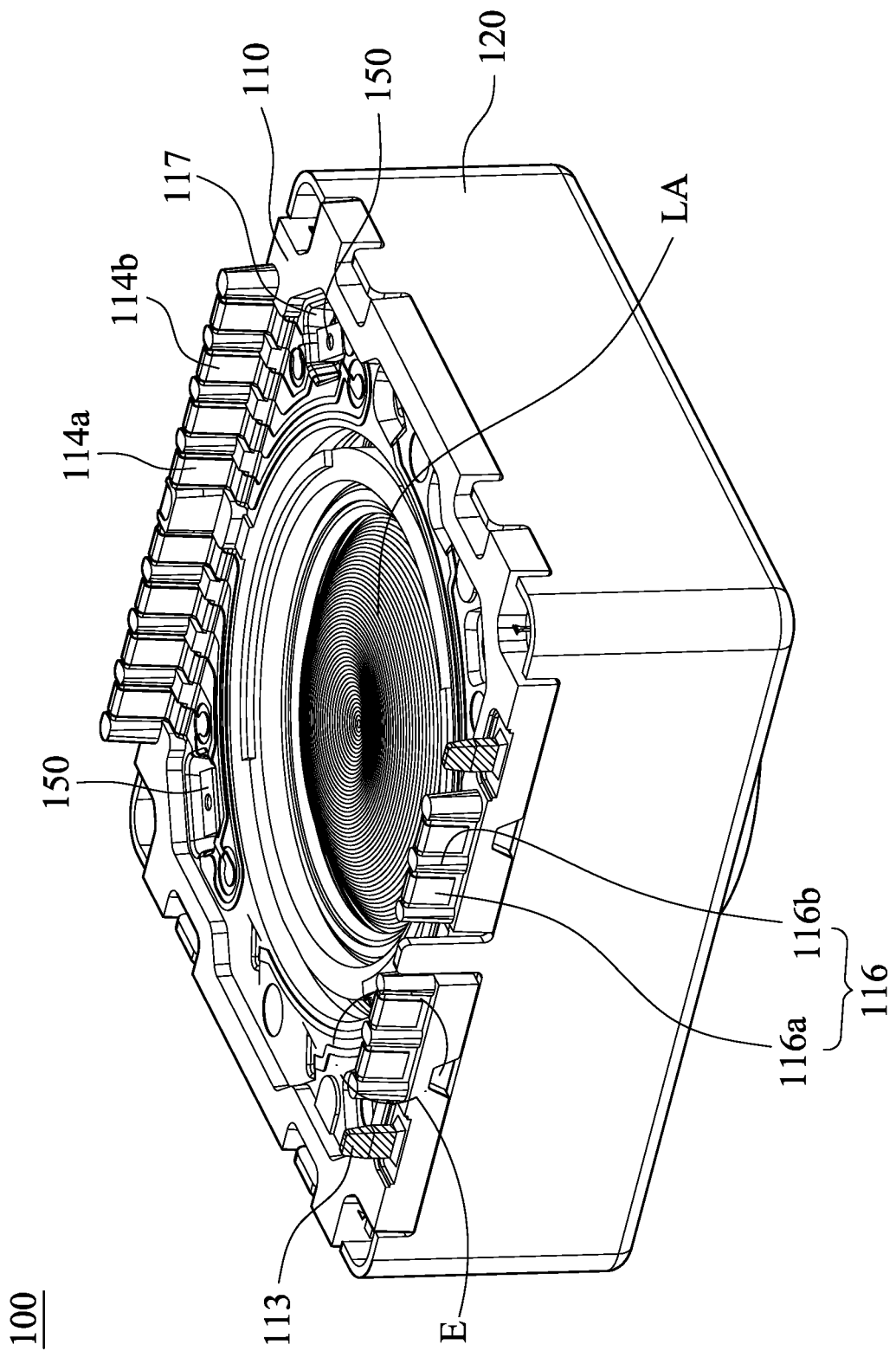
FIG. 4 is another three-dimensional view of the lens assembly actuating module and the lens unit in the combination state of FIG. 3.
Figure 6:
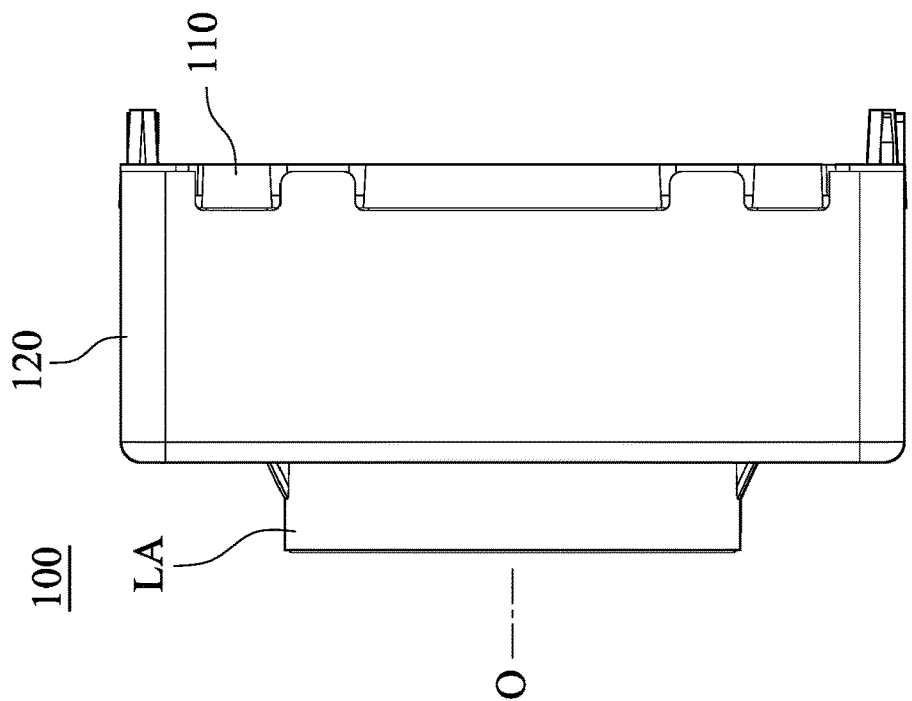
FIG. 6 is a side view of the lens assembly actuating module and the lens unit in the combination state of FIG. 3.
Figure 5:
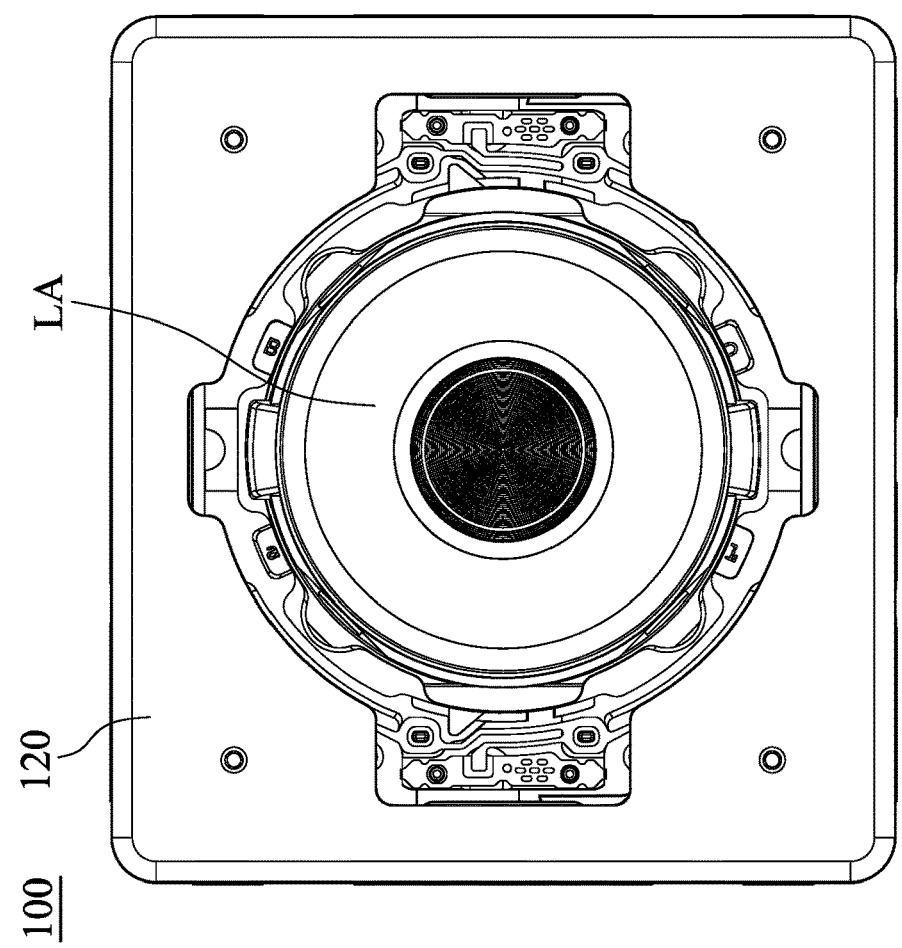
FIG. 5 is a top view of the lens assembly actuating module and the lens unit in the combination state of FIG. 3.

Please refer to FIG. 1 to FIG. 7. FIG. 1 is an exploded view of a lens assembly actuating module 100 according to the 1st embodiment of the present disclosure. FIG. 2 is another exploded view of the lens assembly actuating module 100 in FIG. 1. FIG. 3 is a three-dimensional view of the lens assembly actuating module 100 in FIG. 1 and a lens unit LA in a combination state. FIG. 4 is another three-dimensional view of the lens assembly actuating module 100 and the lens unit LA in the combination state of FIG. 3. FIG. 5 is a top view of the lens assembly actuating module 100 and the lens unit LA in the combination state of FIG. 3. FIG. 6 is a side view of the lens assembly actuating module 100 and the lens unit LA in the combination state of FIG. 3. FIG. 7 is a bottom view of the lens assembly actuating module 100 and the lens unit LA in the combination state of FIG. 3. As shown in FIG. 1 to FIG. 7, the lens assembly actuating module 100 includes a holder 110, a metal yoke 120, a lens actuator 130 and two Hall sensors 150. The metal yoke 120 is coupled with the holder 110 so as to form an accommodating space (its reference numeral is omitted) for accommodating the lens actuator 130. The Hall sensors 150 are disposed on a surface (its reference numeral is omitted) of the holder 110 away from the metal yoke 120.

The holder 110 includes a central opening 111, at least three metal connectors 112, at least two metal terminals 113 and a plurality of plated metal layers 114a, 114b, 114c and 114d (shown in FIG. 7). The metal connectors 112 are insert-molded with the holder 110. The metal terminals 113 are insert-molded with the holder 110. The plurality of plated metal layers 114a, 114b, 114c and 114d are disposed on the surface (its reference numeral is omitted) of the holder 110.

The metal yoke 120 includes a through hole 121, and the through hole 121 is corresponding to the central opening 111 of the holder 110.

Figure 8:
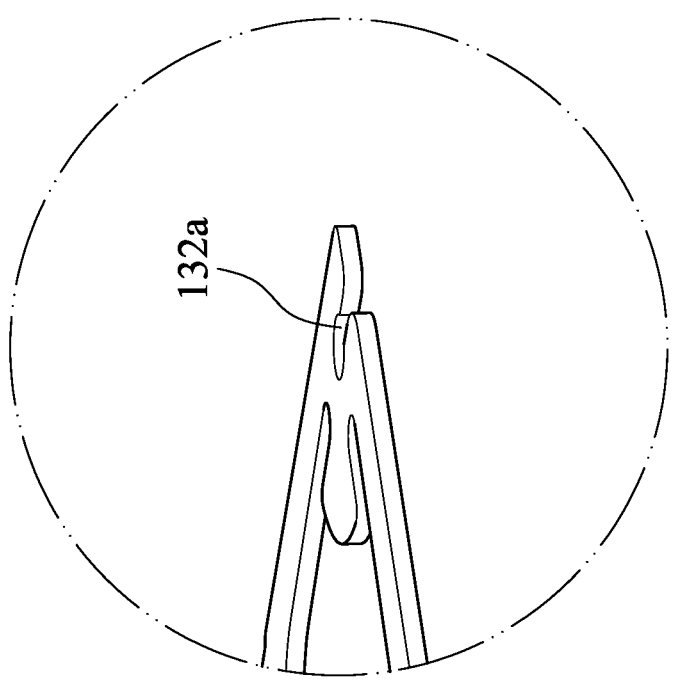
FIG. 8 is an enlarged view of a portion A shown in FIG. 1.

The lens actuator 130 is for carrying a lens unit LA (shown in FIG. 3). The lens unit LA includes an optical axis O. The lens actuator 130 is movably disposed in the metal yoke 120. The lens actuator 130 includes at least one elastic element (its reference numeral is omitted) and at least three metal hanging wires 134. The elastic element is disposed in the metal yoke 120. The elastic element includes a first elastic member 132 and a second elastic member 138. FIG. 8 is an enlarged view of a portion A shown in FIG. 1. As shown in FIG. 1 and FIG. 8, the elastic element includes at least three wire connecting portions 132a. The three wire connecting portions 132a are disposed at the first elastic member 132. One end 134a of each of the metal hanging wires 134 is fixed with one of the wire connecting portions 132a, and the other end 134b of each of the metal hanging wires 134 is fixed with one of the metal connectors 112.

Figure 12:
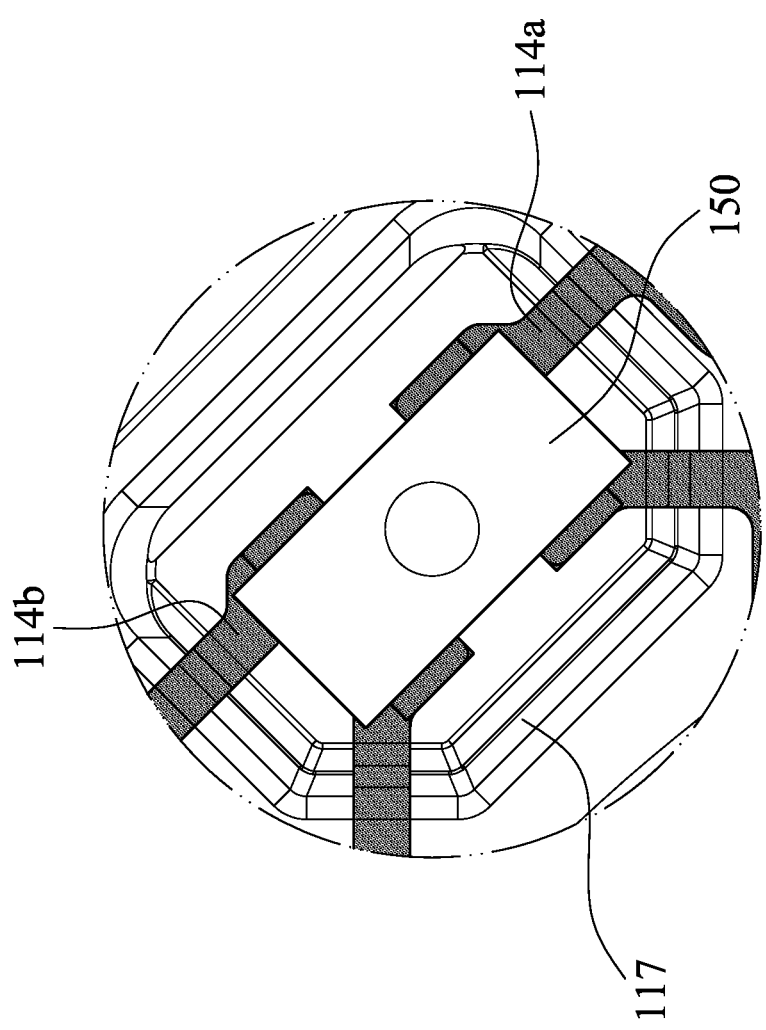
FIG. 12 is an enlarged view of a portion F shown in FIG. 7.

Please refer to FIG. 7 and FIG. 12. FIG. 12 is an enlarged view of a portion F shown in FIG. 7. As shown in FIG. 7 and FIG. 12, each of the Hall sensors 150 is disposed on the plated metal layer 114a and the plated metal layer 114b of the holder 110. The Hall sensors 150 are for detecting a movement of the lens unit LA along a direction perpendicular to the optical axis O.

With the aforementioned structure, it is favorable to test the focus functionality of a semi-finished product (its reference numeral is omitted) assembled by the holder 110 and the lens actuator 130. After the test result is qualified, the circuit wire bonding process, i.e., disposing the plated metal layers 114a, 114b, 114c and 114d on the holder 110, are conducted, then the Hall sensors 150 are disposed on the plated metal layer 114a and the plated metal layer 114b of the holder 110. Accordingly, the waste of material can be reduced, which is favorable for reducing the manufacturing cost.

The term "insert-molded" refers that when manufacturing the holder 110, the insert elements (in the present disclosure, the insert elements are the metal connectors 112 and the metal terminals 113) are firstly placed in a cavity of a mold of the holder 110, then the molten material of the holder 110 is injected into the cavity. After the molten material of the holder 110 is cooled and solidified, the mold is removed, and the holder 110 in a solid state can be obtained, wherein a portion of the insert elements are buried in the holder 110, so that the insert elements are integrally formed with the holder 110. Therefore, it is unnecessary to fix the insert elements with the holder 110 by gluing or assembling. The holder 110 can be, but is not limited to, made by a plastic material or a composite plastic material. The composite plastic material is formed by adding other materials into a plastic material. As such, the property of the composite plastic material can be adjusted according to practical demands. For example, glass fibers can be added into the plastic material so as to enhance to mobility of the plastic material in molten state. Accordingly, the molding quality can be enhanced.

Details of the lens assembly actuating module 100 according to the 1st embodiment are provided hereinafter.

Figure 11:
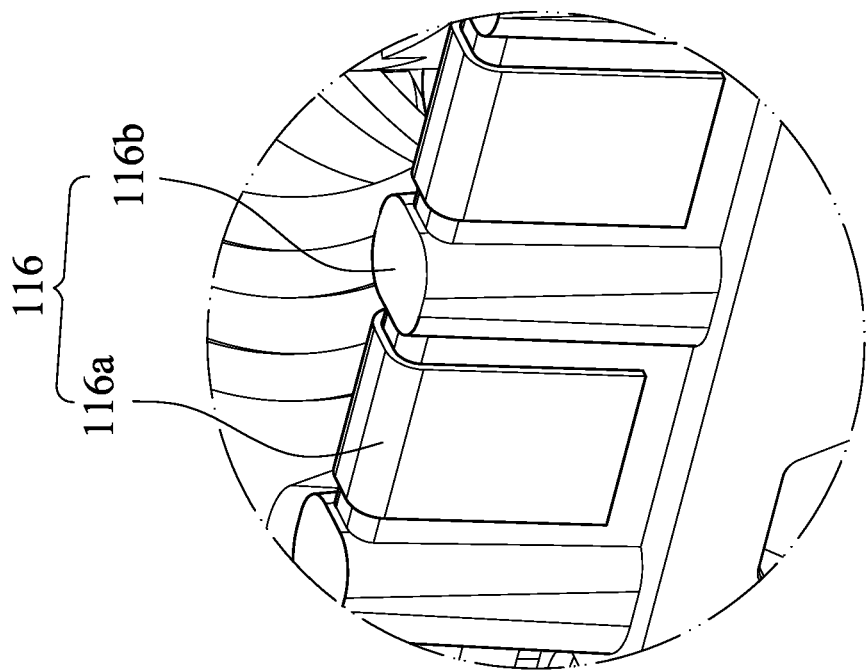
FIG. 11 is an enlarged view of a portion E shown in FIG. 4.

Please refer to FIG. 4, FIG. 7 and FIG. 11. FIG. 11 is an enlarged view of a portion E shown in FIG. 4. In the 1st embodiment, the holder 110 is a square structure. The number of the metal connectors 112 is four, and each of the metal connectors 112 is disposed at a corner of the square structure (i.e., the four metal connectors 112 are disposed at the four corners of the square structure, respectively). Two side walls 116 are respectively disposed between two opposite sides (its reference numeral is omitted) of the square structure and the central opening 111. Therefore, the locations of the metal connectors 112 can enhance the activity of the lens assembly actuating module 100, and interference between the metal connectors 112 and the plated metal layers 114a, 114b, 114c and 114d on the side wall 116 can be reduced, which is favorable for the fluency of assembling process.

The side wall 116 includes at least one standing wall structure 116a and at least one pillar structure 116b, and the standing wall structure 116a and the pillar structure 116b are alternately arranged. Therefore, the quality of injection molding of the side wall 116 can be enhanced. The manufacturing quality of the plated metal layers 114a, 114b, 114c and 114d affected by a twisted side wall 116 can be prevented. Accordingly, the waste products can be effectively reduced.

In the 1st embodiment, the number of the metal terminals 113 is two, and each of the metal terminals 113 is disposed between the metal connector 112 and the side wall 116. Therefore, it is favorable for maintaining the molding quality of the holder 110, and the twist of the holder 110 caused by the plastic shrinkage can be prevented. As such, the manufacturing quality of the plated metal layers 114a, 114b, 114c and 114d are not affected (i.e., unexpected situations of the plated metal layers 114a, 114b, 114c and 114d (such as open circuit) can be avoided), and the circuit conduction between the metal terminals 113 and the first coil 137 (shown in FIG. 1 and FIG. 2) can be improved. Furthermore, a surface of each of the metal terminals 113 can be disposed with a metal layer (not shown). The metal layer can be a double-layer structure. For example, a plated nickel layer can be firstly disposed on the surface of the metal terminal 113, then a plated gold layer can be disposed on the plated nickel layer. Alternatively, the metal layer can be a single-layer structure. For example, the plated gold layer can be directly disposed on the surface of the metal terminal 113. When the plated gold layer is disposed on the surface of the metal terminal 113, the loss of the signal transmission of the first coil 137 can be reduced. Accordingly, the efficiency of the signal transmission can be increased, and the focus quality for driving the lens unit LA can be enhanced.

As shown in FIG. 7, in the 1st embodiment, the holder 110 includes two plated metal layers 114a symmetrical to each other, two plated metal layers 114b symmetrical to each other, two plated metal layers 114c symmetrical to each other, and two plated metal layers 114d symmetrical to each other. The plated metal layers 114a, 114b, 114c and 114d are disposed on the surface of the holder 110 away from the metal yoke 120. Specifically, the plated metal layer 114a extends from a surface of a standing wall structure 116a to a surface of a neighboring standing wall structure 116a. The plated metal layer 114b extends from a surface of a standing wall structure 116a to a surface of a neighboring standing wall structure 116a. The plated metal layer 114c extends from a surface of a standing wall structure 116a to a connector P. The plated metal layer 114d extends from a surface of a standing wall structure 116a to another connector P. In other words, each of the plated metal layers 114a, 114b, 114c and 114d is disposed on the surface of at least one of the standing wall structures 116a. As shown in FIG. 7 and FIG. 12, each of the Hall sensors 150 is disposed on the plated metal layer 114a and the plated metal layer 114b. The Hall sensors 150 can be disposed on the plated metal layer 114a and the plated metal layer 114b by welding, but the present disclosure is not limited thereto. Furthermore, in the present disclosure, the plated metal layers 114a, 114b, 114c and 114d are sprinkled with dots, which is for helping to observe the locations of the plated metal layers 114a, 114b, 114c and 114d on the holder 110.

Figure 9:
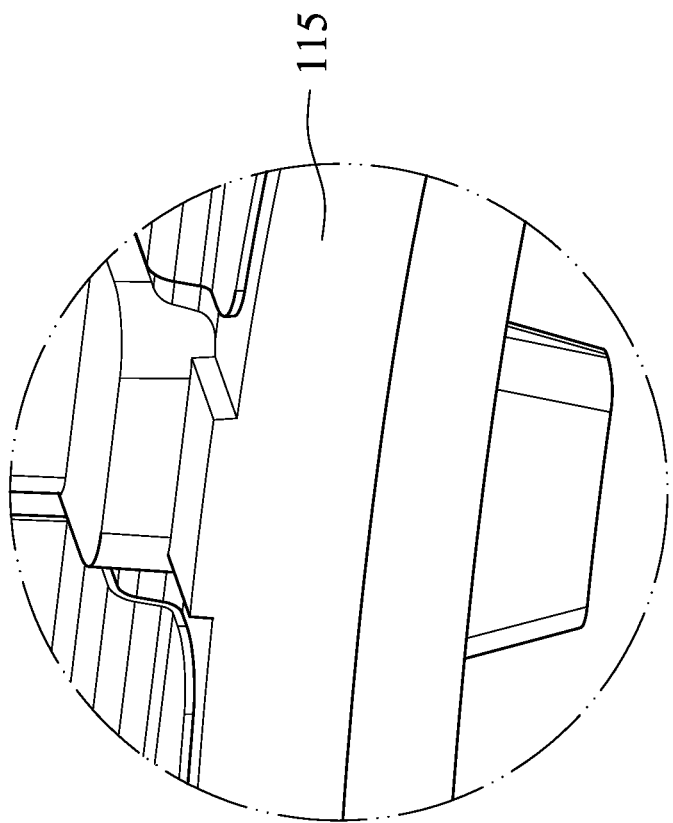
FIG. 9 is an enlarged view of a portion B shown in FIG. 2.

Please refer to FIG. 7 and FIG. 9. FIG. 9 is an enlarged view of a portion B shown in FIG. 2. In the 1st embodiment, the plated metal layers 114a, 114b, 114c and 114d are not disposed on an inner surface 115 of the holder 110 surrounding the central opening 111. Therefore, the complexity of the path of the plated metal layers 114a, 114b, 114c and 114d can be reduced. Moreover, most of the plated metal layers 114a, 114b, 114c and 114d are disposed at a portion of the holder 110 with a larger area, which can enhance the efficiency of wire bonding and simplify the manufacturing process.

As shown in FIG. 7, in the 1st embodiment, when a distance range centered at one of the metal terminals 113 has a radius of d, and the plated metal layers 114a, 114b, 114c and 114d are not disposed within the distance range on the surface of the holder 110, the following condition can be satisfied: 0.4 mm<d<1.8 mm. Therefore, it is favorable for the following welding process of the metal terminals 113. Specifically, it can prevent that the metal terminals 113 and the plated metal layers 114a, 114b, 114c and 114d are too close to cause the short circuit of welding.

As shown in FIG. 7, in the 1st embodiment, when the distance range centered at one of the metal terminals 113 has the radius of d, the plated metal layers 114a, 114b, 114c and 114d are not disposed within the distance range on the surface of the holder 110, and a radius of the central opening 111 is R, the following condition can be satisfied: 0.05<d/R<0.55. Therefore, the ratio of d to R is proper. When the value of R is excessively large, the margin degree for arranging the plated metal layers 114a, 114b, 114c and 114d will be compressed. When the value of d is excessively large, the distribution of the plated metal layers 114a, 114b, 114c and 114d are too concentrated, which will affect the manufacturing quality of the process of laser direct structuring (LDS).

Figure 13:
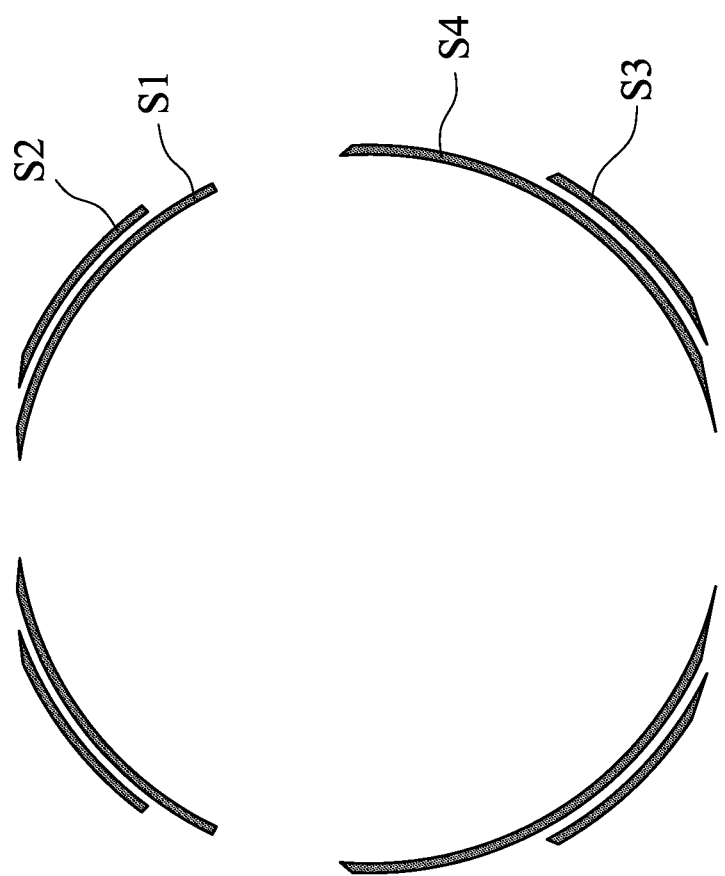
FIG. 13 is a schematic view showing arc portions in FIG. 4.

Please refer to FIG. 7 and FIG. 13. FIG. 13 is a schematic view showing arc portions S1, S2, S3 and S4 in FIG. 4. In the 1st embodiment, the plated metal layer 114a includes the arc portions S1 and S2, the plated metal layer 114c includes the arc portion S4, and the plated metal layer 114d includes the arc portion S3. The arc portions S1, S2, S3 and S4 surround the central opening 111 and are separated from an edge (its reference numeral is omitted) of the central opening 111 with a predetermined distance (its reference numeral is omitted). When an area of each of the arc portions S1, S2, S3 and S4 is Ac, and an area of each of the Hall sensors 150 is Ah, the following condition can be satisfied: 0.4<Ac/Ah<2.5. Therefore, the shapes of the plated metal layers 114a, 114b, 114c and 114d are proper, which can use the surface of the holder 110 effectively and is suitable for the Hall sensors 150 with smaller size. The predetermined distance can be in a range of 0.02 mm to 0.8 mm. Furthermore, "the arc portions S1, S2, S3 and S4 are separated from an edge of the central opening 111 with a predetermined distance" refers that there has the predetermined distance between each of the arc portions S1, S2, S3 and S4 and the edge of the central opening 111. As for an identical arc portion (S1, S2, S3 or S4), the predetermined distance between the arc portion and the edge of the central opening 111 can be a fixed value or an unfixed value.

When a total area of the arc portions S1, S2, S3 or S4 is sum Ac, the following condition can be satisfied: $1.0\ mm^2 <$ sum $Ac<5.0\ mm^2$. Therefore, the total area of the arc portions S1, S2, S3 or S4 is smaller, which is favorable for arranging a more complicated circuit in a limited space.

As shown in FIG. 7 and FIG. 12, in the 1st embodiment, the holder 110 can further include two concave surfaces 117. Each of the concave surfaces 117 is corresponding to one of the Hall sensors 150, and each of the concave surfaces 117 is concave along a direction from the central opening 111 to the through hole 121. Therefore, the second coil 139 (shown in FIG. 1 and FIG. 2) can be tested after disposing of the plated metal layers 114a, 114b, 114c and 114d. After the test is finished, the Hall sensors 150 are disposed. As such, the cost of waste product in every process stage can be reduced, and the manufacturing quality can be effectively maintained.

As shown in FIG. 7, in the 1st embodiment, when a distance between the two metal terminals 113 is L, and the radius of the central opening 111 is R, the following condition can be satisfied: 0.4<L/2R<1.2. Therefore, the arrangement of the metal terminals 113 is corresponding to the central opening 111, which can effectively control the quality of insert molding and reduce the probability of appearance flaw.

As shown in FIG. 1 and FIG. 2, in the 1st embodiment, the lens actuator 130 includes fixing elements 131, the elastic element (its reference numeral is omitted), a frame 133, metal hanging wires 134, magnets 135, a carrier 136, the first coil 137 and the second coil 139, wherein the elastic element includes the first elastic member 132 and the second elastic member 138.

The number of the fixing elements 131 is two. The fixing elements 131 are for fixing ends of the wire (not shown) of the first coil 137.

The first elastic member 132 is disposed at a side of the frame 133 and a side of the carrier 136. The first elastic member 132 includes two springs. As shown in FIG. 1 and FIG. 8, each of the springs includes two wire connecting portions 132a. In other words, the number of the wire connecting portions 132a of the first elastic member 132 is four.

Figure 10A:
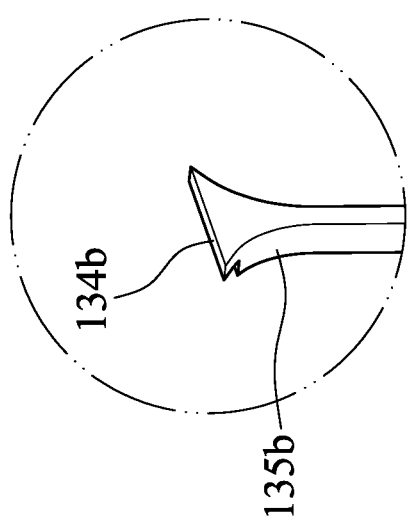
FIG. 10A is an enlarged view of a portion C shown in FIG. 2.
Figure 10B:
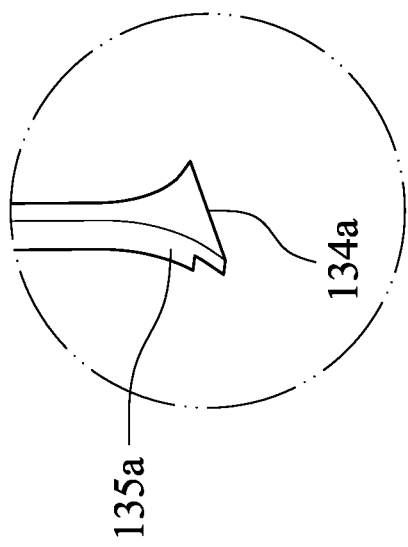
FIG. 10B is an enlarged view of a portion D shown in FIG. 2.

The number of the metal hanging wires 134 is four. The metal hanging wires 134 are substantially parallel to the optical axis O (i.e., each of the metal hanging wires 134 is substantially parallel to the optical axis O along a length direction thereof). The end 134a of each of the metal hanging wires 134 is fixed with one of the wire connecting portions 132a, and the other end 134b of each of the metal hanging wires 134 is fixed with one of the metal connectors 112. As shown in FIG. 7, the metal connectors 112 are notch shaped. As shown in FIG. 8, the wire connecting portions 132a are notch shaped. With at least one of the metal connectors 112 and the wire connecting portions 132a being notch shaped, it is favorable for enhancing the margin degree of assembling the metal hanging wires 134. Therefore, the assembling method is not limited to upwardly or downwardly pass through the through hole of the first elastic member 132. Please refer to FIG. 10A and FIG. 10B. FIG. 10A is an enlarged view of a portion C shown in FIG. 2. FIG. 10B is an enlarged view of a portion D shown in FIG. 2. As shown in FIG. 10A and FIG. 10B, the end 134a of the metal hanging wire 134 includes an uneven width portion 135a, and the other end 134b of the metal hanging wire 134 includes an uneven width portion 135b. Therefore, it is favorable for the grip process of the assembling stage. Specifically, the probability of slipping during grip can be reduced, so that the parallel degree of the four metal hanging wires 134 can be enhanced, and the assembling quality can be enhanced. The phrase "uneven width" refers that the portion (i.e., the uneven width portion 135a or the uneven width portion 135b) has at least two different widths, and a direction of the width is perpendicular to the direction of the length of the metal hanging wire 134. Moreover, in each of the metal hanging wires 134, a total length of the uneven width portions 135a and 135b is less than 10% of a total length of the metal hanging wire 134. Therefore, the ratio of the uneven width portions 135a and 135b can be reduced, which can enhance the flexibility of the metal hanging wire 134, so that the movement of the lens assembly actuating module 100 along the direction perpendicular to the optical axis O can be smoother, and the mechanical quality of the lens assembly actuating module 100 can be enhanced. In the 1st embodiment, a total length of the metal hanging wire 134 is 2.9811 mm, a length of the uneven width portion 135a is 0.0955 mm, and a length of the uneven width portion 135b is 0.0955 mm, which can calculate that a total length of the uneven width portions 135a and 135b is 6.4% of the total length of the metal hanging wire 134.

As shown in FIG. 1 and FIG. 2. The number of the magnets 135 is four. The magnets 135 are disposed in the frame 133, and the magnets 135 surround the first coil 137.

The carrier 136 is disposed in the frame 133. The carrier 136 is for coupling with the lens unit LA, and can bring the lens unit LA to move along a direction parallel to the optical axis O, so that the focus functionality of the lens assembly actuating module 100 can be achieved.

The first coil 137 surrounds the carrier 136 and is corresponding to the magnets 135.

The second elastic member 138 includes two springs (reference numerals thereof are omitted). The two springs are separated with each other, and the two springs are arranged on a same horizontal plane. Therefore, the two springs of the second elastic member 138 can be employed as transmission path of current signals for the first coil 137 (i.e., can be employed to send current signals required by the first coil 137).

In the 1st embodiment, the current path can be arranged as follows. The first coil 137 is conducted with the metal connectors 112 via the first elastic member 132 and the metal hanging wires 134, and the metal connectors 112 are conducted with the metal terminals 113. With the current path, the metal terminals 113 can receive a driving current and send it to the first coil 137, so that an electromagnetic force can be generated by the interaction of the magnets 135 and the first coil 137.

With the current path, the actuation of the lens assembly actuating module 100 is as follows. The lens assembly actuating module 100 can obtain an electronic signal according to light of an imaged object (not shown) entering into the lens unit LA. The electronic signal is then sent to an electronic driver (not shown), and the electronic driver provides a driving current through the metal terminals 113 to the first coil 137. With the electromagnetic force generated by the interaction of the magnets 135 and the first coil 137, the carrier 136 is driven to bring the lens unit LA to move along the direction parallel to the optical axis O, so that the focus functionality of the lens unit LA can be achieved. In the above focusing process, when the lens unit LA is moved, a degree of freedom of the carrier 136 and the lens unit LA along the direction parallel to the optical axis O can be provided by the first elastic member 132 and the second elastic member 138. The first elastic member 132 and the second elastic member 138 are deformed along the movement of the carrier 136, and provide a restoring force to the carrier 136 when the carrier 136 moves back to an initial position thereof.

In the image capturing process, an offset along the direction perpendicular to the optical axis O of the magnets 135 and the lens unit LA may be caused by a shake, such as a hand tremor, and a change of the magnetic field between the magnets 135 and the Hall sensors 150 is generated thereby. The Hall sensors 150 detect the change of the magnetic field of the magnets 135 and provides an electronic signal corresponding to the offset to an electronic driver, and the electronic driver adjusts a current provided to the second coil 139, whereby the electromagnetic force generated by the interaction of the magnets 135 and the second coils 139 drives the magnets 135 and the lens unit LA to move, so that another offset along another direction perpendicular to the optical axis O is generated, and the original offset can be compensated. Therefore, the image can be stabilized, and the problem results from the hand tremor can be resolved. The electronic driver used in the focusing process of the lens unit LA and the electronic driver used in compensating the offset can be identical or different.

In the 1st embodiment, values of parameters L, R, L/2R, d, d/R, Ac, Ah, Ac/Ah and sum Ac are listed in Table 1.

TABLE 1

| L [mm] | 6.00 | Ac [mm$^2$] | 0.320, 0.197, 0.220, 0.490 |
|---|---|---|---|
| R [mm] | 3.66 | Ah [mm$^2$] | 0.320 |
| L/2R | 0.82 | Ac/Ah | 1.000, 0.616, 0.688, 1.531 |
| d [mm] | 1.05 | sum Ac [mm$^2$] | 2.454 |
| d/R | 0.29 | | |

Note:
the four values of Ac, in order from left to right, are the areas of arc portions S1, S2, S3 and S4. Because the number of each of the arc portions S1, S2, S3 an S4 is two. The value of sum Ac equals to the sum of each of the areas of the arc portions S1, S2, S3 an S4 multiplied by two.

2nd Embodiment

Figure 14A:
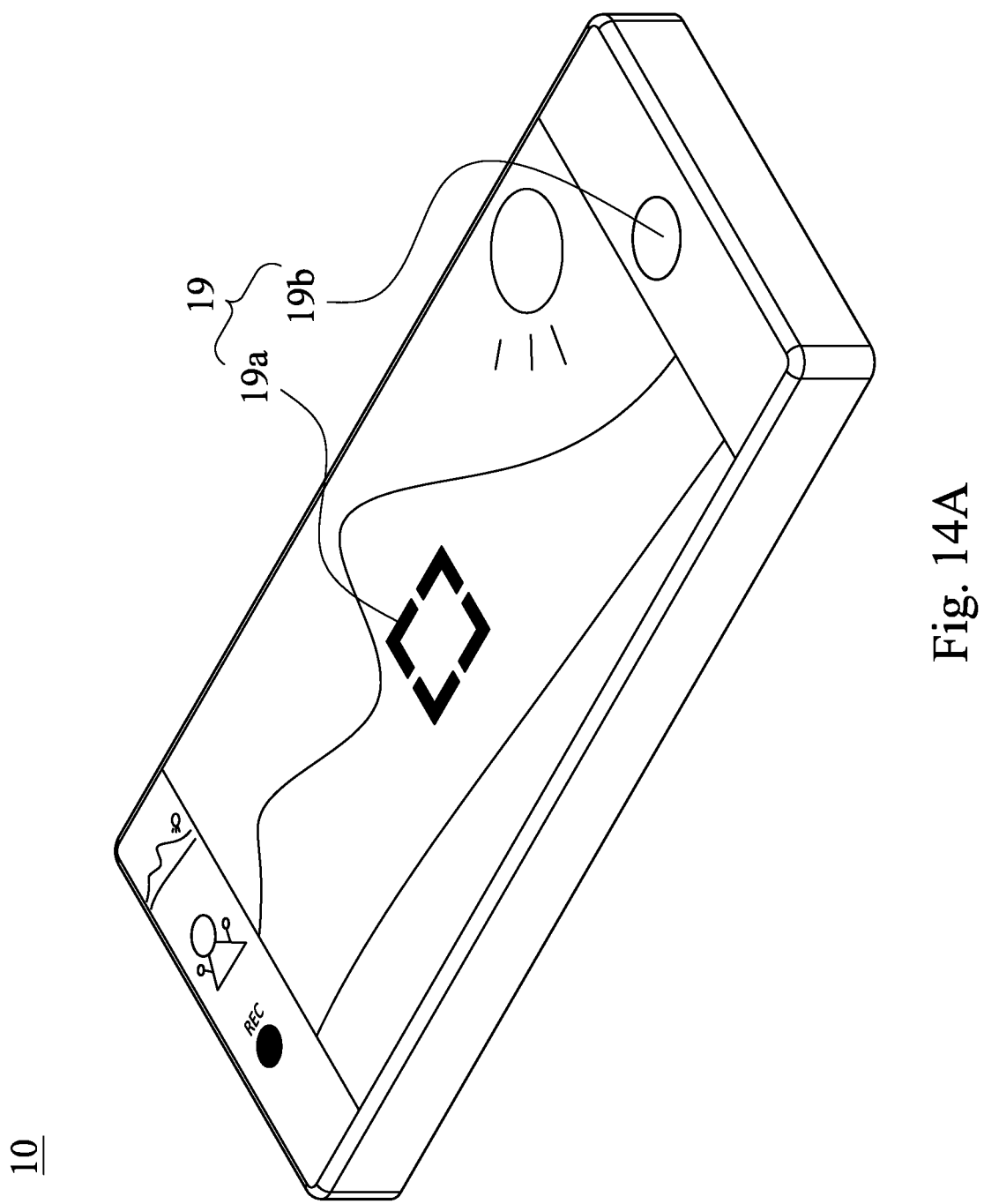
FIG. 14A is a schematic view showing an electronic device according to the 2nd embodiment of the present disclosure.
Figure 14B:
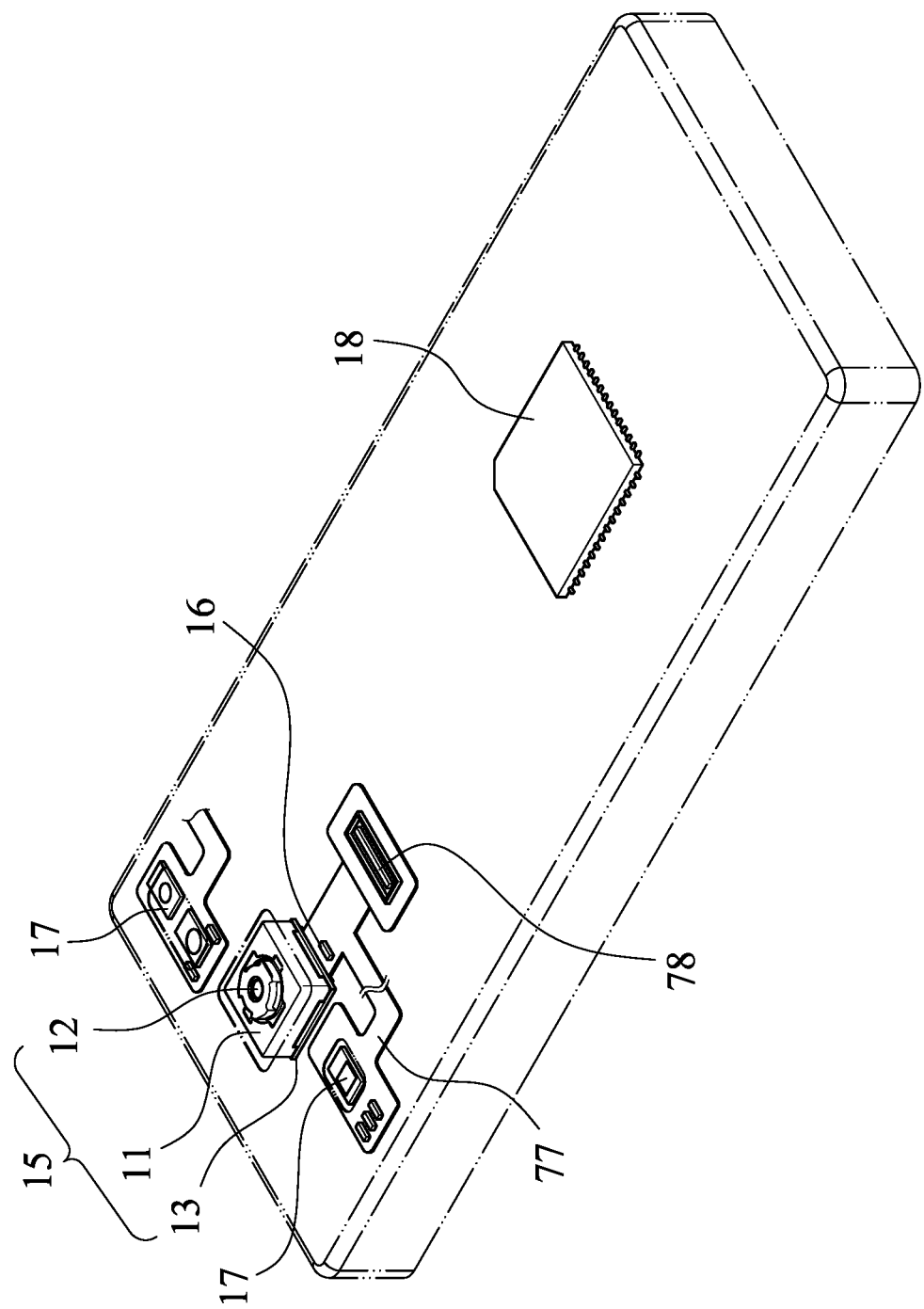
FIG. 14B is another schematic view of the electronic device in FIG. 14A.
Figure 14C:
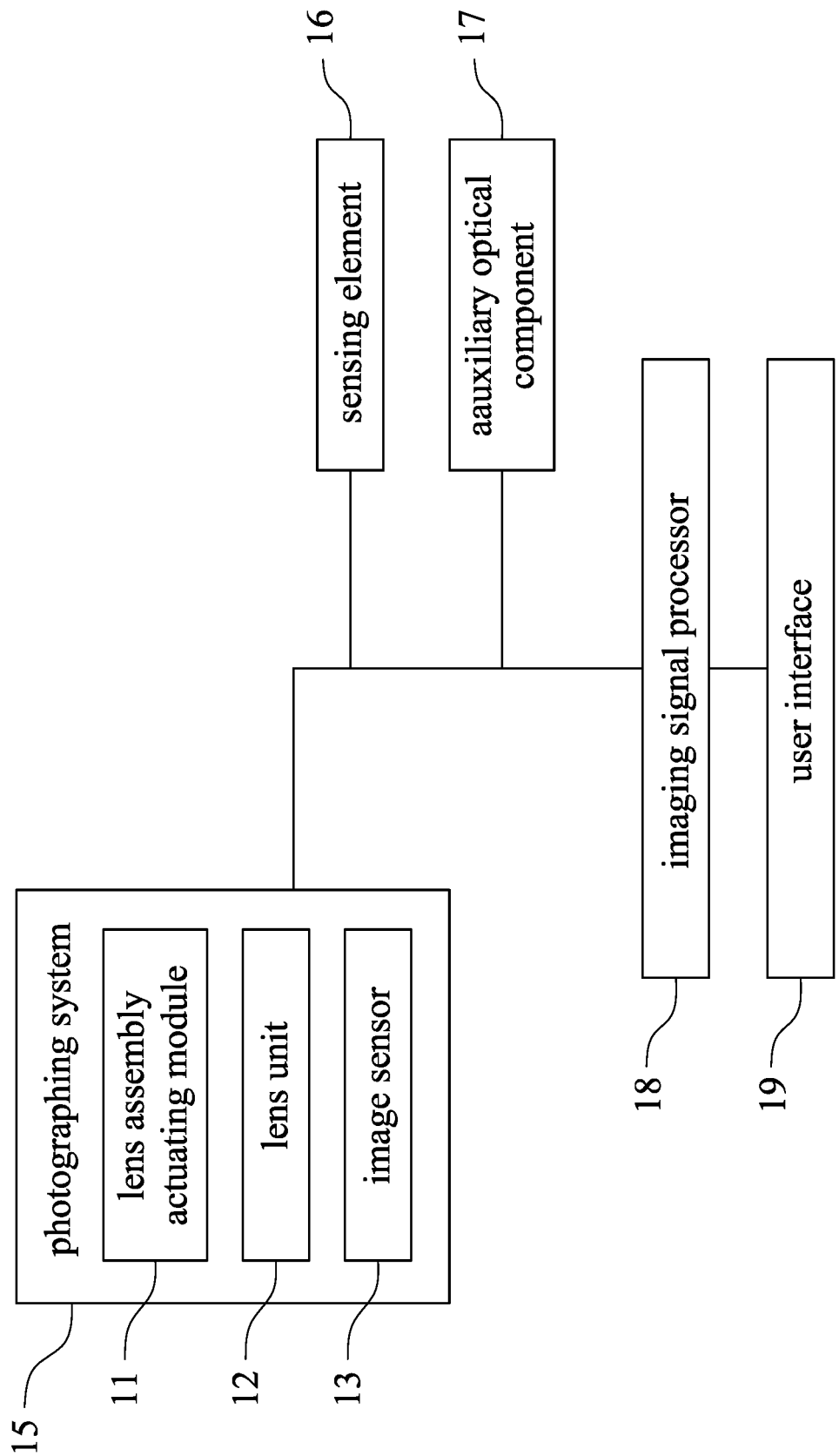
FIG. 14C is a block diagram of the electronic device in FIG. 14A.

Please refer to FIG. 14A to FIG. 14C. FIG. 14A is a schematic view showing an electronic device 10 according to the 2nd embodiment of the present disclosure. FIG. 14B is another schematic view of the electronic device 10 in FIG. 14A. FIG. 14C is a block diagram of the electronic device 10 in FIG. 14A. Particularly, FIG. 14A and FIG. 14B are schematic views related to a camera of the electronic device 10, and FIG. 14C is the block diagram related to the camera of the electronic device 10. As shown in FIG. 14A and FIG. 14B, the electronic device 10 of the 2nd embodiment is a smart phone, wherein the electronic device 10 includes a photographing system 15, and the photographing system 15 includes the lens assembly actuating module 11 according to the present disclosure, a lens unit 12 and an image sensor 13. The image sensor 13 is disposed on an image surface (not shown herein) of a lens assembly (its reference numeral is omitted) of the lens unit 12 for receiving an imaging light from the lens assembly. Therefore, the requirement of compactness for current electronic devices 10 can be satisfied.

The electronic device 10 can further include at least one sensing element 16, at least one auxiliary optical component 17, an image signal processor (ISP) 18, an user interface 19, a circuit board 77 and a connector 78, wherein the user interface 19 includes a touch screen 19a and a button 19b.

Furthermore, the user activates the capturing mode via the user interface 19 (the touch screen 19a or the button 19b) of the electronic device 10. At this moment, the imaging light is converged on the image sensor 13 by the lens assembly actuating module 11 and the lens unit 12, and the electronic signal associated with image is output to the image signal processor 18.

The auxiliary optical component 17 can be a flash module for compensating color temperature, an infrared distance measurement component, a laser focus module, etc. The sensing element 16 can have functions for sensing physical momentum and kinetic energy, such as an accelerator, a gyroscope, to sense shaking or jitters applied by hands of the user or external environments. Accordingly, the functions of the lens assembly actuating module 11 of the photographing system 15 can be enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the autofocus function of what you see is what you get.

Furthermore, as shown in FIG. 14B, the photographing system 15, the sensing element 16 and the auxiliary optical component 17 can be disposed on the circuit board 77 (the circuit board 77 is a flexible printed circuit board, FPC) and electrically connected with the associated components, such as the imaging signal processor 18, via the connector 78 to perform a capturing process. Since current electronic devices, such as smart phones, have a tendency of being compact. In the 2nd embodiment, the way of firstly disposing the photographing system 15 and related components on the flexible printed circuit board 77 and secondly integrating the circuit thereof into the main board of the electronic device 10 via the connector 78 can satisfy the mechanical design of the limited space inside the electronic device 10 and the layout requirements and obtain more margins. The autofocus function of the photographing system 15 can also be controlled more flexibly via the touch screen 19a of the electronic device 10. In other embodiments (not shown herein), the sensing element 16 and the auxiliary optical component 17 can also be disposed on the main board of the electronic device 10 or carrier boards of other types according to requirements of the mechanical design and the circuit layout.

In addition, the electronic device 10 can further include but not be limited to a wireless communication unit, a control unit, a storage unit, a random access memory (RAM), a read-only memory (ROM), or a combination thereof.

3rd Embodiment

Figure 15:
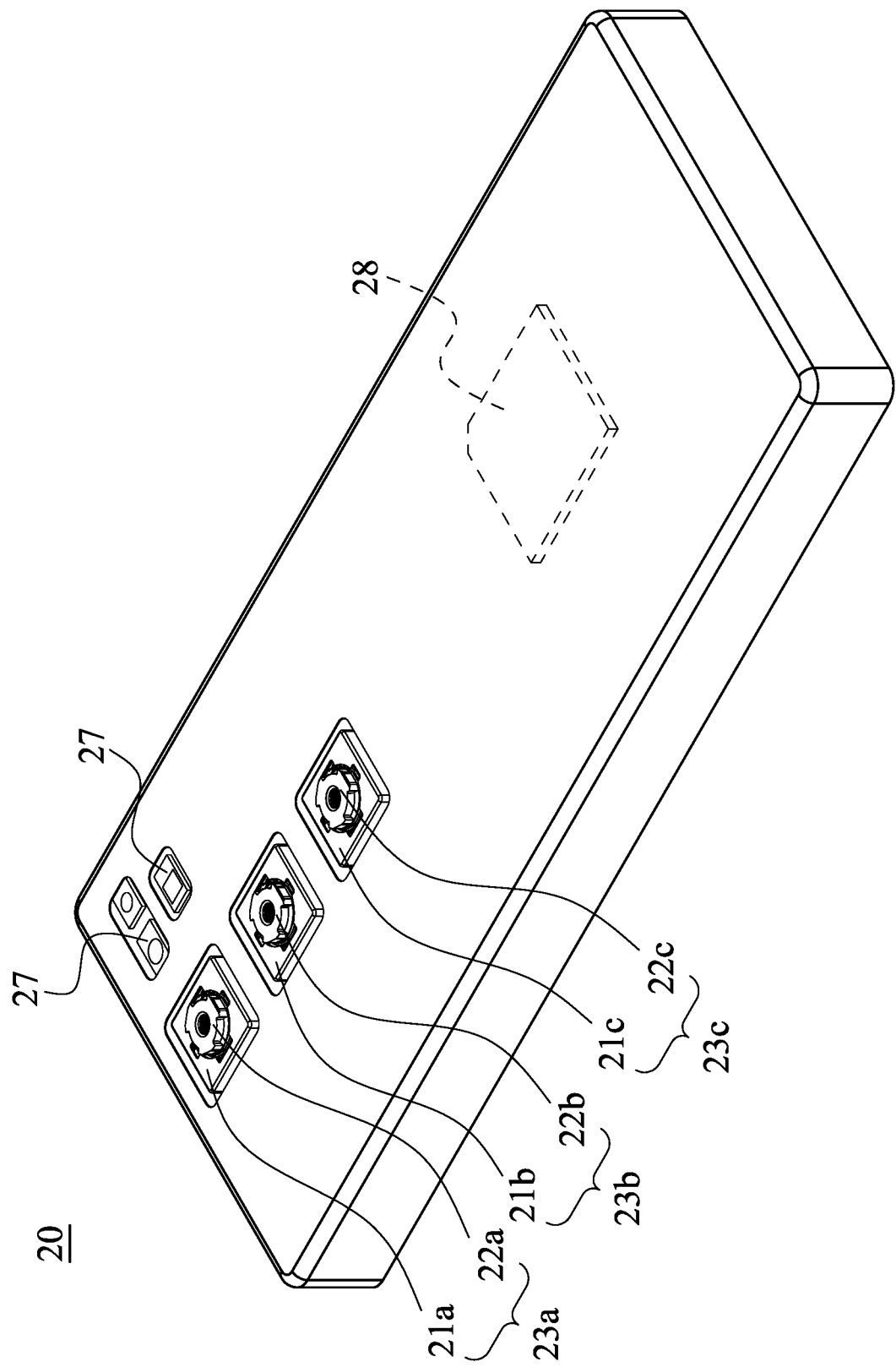
FIG. 15 is a schematic view showing an electronic device according to the 3rd embodiment of the present disclosure.

FIG. 15 is a schematic view showing an electronic device 20 according to the 3rd embodiment of the present disclosure. As shown in FIG. 15, the electronic device 20 of the 3rd embodiment is a smart phone, wherein the electronic device 20 includes a photographing system 23a, a photographing system 23b and a photographing system 23c. The photographing system 23a includes a lens assembly actuating module 21a, a lens unit 22a and an image sensor (not shown). The image sensor is disposed on an image surface (not shown herein) of the lens assembly (its reference numeral is omitted) of the lens unit 22a for receiving an imaging light from the lens assembly. The photographing system 23b includes a lens assembly actuating module 21b, a lens unit 22b and an image sensor (not shown). The image sensor is disposed on an image surface (not shown) of the lens assembly (its reference numeral is omitted) of the lens unit 22b for receiving an imaging light from the lens assembly. The photographing system 23c includes a lens assembly actuating module 21c, a lens unit 22c and an image sensor (not shown). The image sensor is disposed on an image surface (not shown herein) of the lens assembly (its reference numeral is omitted) of the lens unit 22c for receiving an imaging light from the lens assembly.

Moreover, at least one of the lens assembly actuating module 21a, the lens assembly actuating module 21b and the lens assembly actuating module 21c is the lens assembly actuating module according to the present disclosure. The optical properties of the lens assemblies of the lens unit 22a, the lens unit 22b and the lens unit 22c can be the same or different. During the capturing process of the electronic device 20, with the aid of the auxiliary optical component 27, three images can be obtained by the photographing system 23a, the photographing system 23b and the photographing system 23c, then effects, such as a zoom effect and an exquisite effect, can be provided by the processing element (such as the imaging signal processor 28) of the electronic device 20.

Details of the auxiliary optical component 27 can refer to that of the auxiliary optical component 17 of the 2nd embodiment, and are not described herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lens assembly actuating module, comprising:
    a holder, comprising:
        a central opening;
        at least three metal connectors insert-molded with the holder;
        at least two metal terminals insert-molded with the holder; and
        a plurality of plated metal layers disposed on a surface of the holder;
    a metal yoke coupled with the holder, wherein the metal yoke comprises a through hole, and the through hole is corresponding to the central opening of the holder;
    a lens actuator for carrying a lens unit, wherein the lens unit comprises an optical axis, the lens unit is movably disposed in the metal yoke through the lens actuator, and the lens actuator comprises:
        at least one elastic element disposed in the metal yoke, wherein the elastic element comprises at least three wire connecting portions; and
        at least three metal hanging wires, wherein one end of each of the metal hanging wires is fixed with one of the wire connecting portions, and the other end of each of the metal hanging wires is fixed with one of the metal connectors; and
    a Hall sensor disposed on one of the plated metal layers of the holder, wherein the Hall sensor is for detecting a movement of the lens unit along a direction perpendicular to the optical axis;
    wherein a distance range centered at one of the metal terminals has a radius of d, the plated metal layers are not disposed within the distance range on the surface of the holder, a radius of the central opening is R, and the following condition is satisfied:

$$0.05 < d/R < 0.55.$$

2. The lens assembly actuating module of claim 1, wherein the plated metal layers are not disposed on an inner surface of the holder surrounding the central opening.

3. The lens assembly actuating module of claim 1, wherein the distance range centered at one of the metal terminals has the radius of d, the plated metal layers are not disposed within the distance range on the surface of the holder, and the following condition is satisfied:

$$0.4 \text{ mm} < d < 1.8 \text{ mm}.$$

4. The lens assembly actuating module of claim 1, wherein at least one of the plated metal layers comprises at least one arc portion, the arc portion surrounds the central opening and are separated from an edge of the central opening with a predetermined distance, an area of the arc portion is Ac, an area of the Hall sensor is Ah, and the following condition is satisfied:

$$0.4 < Ac/Ah < 2.5.$$

5. The lens assembly actuating module of claim 4, wherein a number of the arc portion is greater than or equal to two, a total area of the arc portions is sum Ac, and the following condition is satisfied:

$$1.0 \text{ mm}^2 < \text{sum } Ac < 5.0 \text{ mm}^2.$$

6. The lens assembly actuating module of claim 1, wherein at least one of the two ends of each of the metal hanging wires comprises an uneven width portion.

7. The lens assembly actuating module of claim 6, wherein in each of the metal hanging wires, a total length of the uneven width portion is less than 10% of a total length of the metal hanging wire.

8. The lens assembly actuating module of claim 1, wherein the holder is a square structure, each of the metal connectors is disposed at a corner of the square structure, and two side walls are respectively disposed between two opposite sides of the square structure and the central opening.

9. The lens assembly actuating module of claim 8, wherein each of the two side walls comprises at least one standing wall structure and at least one pillar structure, the standing wall structure and the pillar structure are alternately arranged, and one of the plated metal layers is disposed on a surface of the standing wall structure.

10. The lens assembly actuating module of claim 1, wherein the holder further comprises a concave surface, the concave surface is corresponding to the Hall sensor, and the concave surface is concave along a direction from the central opening to the through hole.

11. The lens assembly actuating module of claim 1, wherein at least one of the wire connecting portions and the metal connectors is notch shaped.

12. An electronic device, comprising:
    the lens assembly actuating module of claim 1.

* * * * *